Dec. 11, 1928.
J. W. ANDERSON
INDICATING DEVICE
Filed May 29, 1926
1,694,904
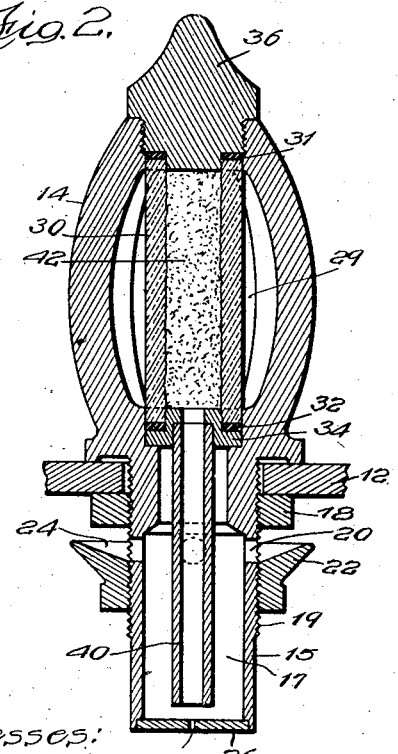
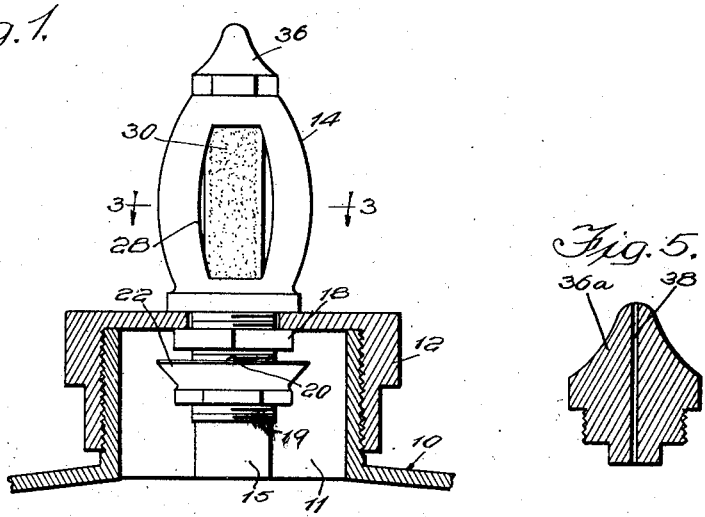
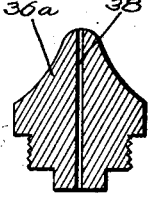
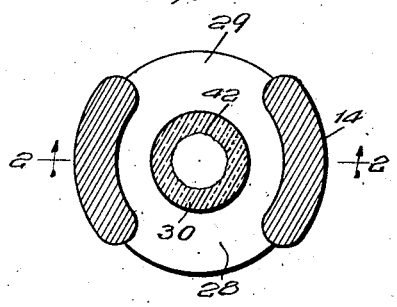
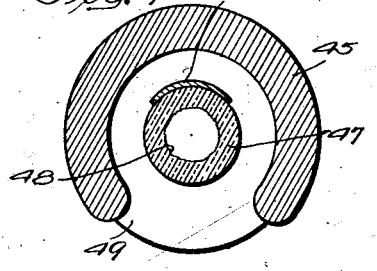
Witnesses:
William R. Kilroy
Harry R. L. White
Inventor:
John W. Anderson
By Hill & Hill
Attys Patented Dec. 11, 1928.

1,694,904

UNITED STATES PATENT OFFICE.

JOHN W. ANDERSON, OF GARY, INDIANA.

INDICATING DEVICE.

Application filed May 29, 1926. Serial No. 112,713.

My invention relates to indicating devices and particularly to pressure indicating devices.

The invention has among its other objects the production of devices of the kind described which are compact, convenient and of simplified construction.

A particular object of the invention is to provide an improved device for indicating a rise in pressure in an automobile radiator, or the equivalent.

One form of the invention is embodied in a device adapted to be mounted upon the filling cap of an automobile radiator and comprises a glass tube, or the equivalent, into which liquid obtained from the radiator rises when the cooling liquid in the radiator simmers, the driver of the automobile thus receiving a warning that unless certain conditions are corrected or changed the cooling liquid will boil and waste.

In another form of the invention which comprises substantially the same parts of the first-mentioned form, the glass tube is provided with a backing or coating of colored material, which becomes distinctly visible through the tube when the tube is filled with liquid.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is a front elevation of a pressure indicating device embodying the invention, the device being shown in connection with the filling cap of a radiator;

Fig. 2 is a substantially central section taken through the improved indicating device shown in Fig. 1;

Fig. 3 is a transverse section taken on line 3—3 of Fig. 1;

Fig. 4 is a transverse section taken through an indicating device embodying another form of the invention; and Fig. 5 is a section through a closure member embodying another form of the invention.

While I have elected to disclose my invention as it is embodied in devices for indicating pressures obtaining in automobile radiators, it is to be understood that I am limited to this use only to the extent indicated in the appended claims as my invention may be embodied in devices adapted to indicate the pressure obtaining within boilers, vacuum tanks or other apparatus.

Referring now to Figs. 1 to 3, inclusive, of the drawing wherein I have shown a preferred form of the invention embodied in a device for indicating the conditions under which the internal combustion engine of an automobile is operating, the reference character 10 designates a portion of a radiator of the type commonly employed in automobiles and the like, as parts of the cooling systems thereof. The radiator 10 is provided with a filling opening 11 which is normally closed by a cap 12. The improved device is preferably carried by the cap 12 and preferably comprises a housing member 14 formed with a chambered part 15 adapted to project into the radiator through the cap 12, the chamber in said chambered part 15 being designated by the reference character 17. The housing member 14 may be secured to the cap 12 by any suitable means, such as, for instance, a nut 18 engaging external screw-threads 19 formed upon the chambered part. A plurality of apertures 20 formed in the chambered part 15 permit vapor to pass from the interior of the radiator 10 into the chamber 17, the apertures 20 being spaced from the bottom of the chamber 17, so that the vapor may condense and collect in the chamber. I preferably provide a ring 22 screw-threaded upon the chambered part 15 and provided with an annular depression 24 in its upper surface. Obviously, vapor condensing in the depression 24 will drain to the chamber 17 through the apertures 20. In this instance, the chamber 17 is closed at its bottom by a disc 26 secured to the chambered part 15 and provided with a relatively small aperture 27 through which liquid may drain from the chamber 17 back into the radiator. Thus, if the automobile is not in use, any liquid which has collected in the chamber 17 will be returned slowly to the cooling system and therefore will not freeze in the chamber.

The upper portion of the housing member 14 may be formed with front and rear side apertures 28 and 29 through which a glass tube 30 may be viewed, the glass tube being mounted in the upper portion of the housing member 14. As best shown in Fig. 2, packing rings 31 and 32 are preferably provided at the upper and lower ends, respectively, of the glass tube 30, an apertured plug 34 being provided in the housing member against which the packing member 32 seats. A closure member 36, or the equivalent, is screw-threaded into the upper end of the housing member 14 and closes the upper end of the glass tube 30. Depending from the apertured plug 34 and communicating with the interior of the glass tube 30 is a tubular member 40 which preferably extends to a point adjacent the closure member 26 at the bottom of the chamber 17.

The glass tube 30 may be termed "a liquid level gauge" and is preferably of the type more fully shown and described in my co-pending application, Serial No. 112,714, filed May 29, 1925. The interior surface of the glass tube 30 is preferably ground, sandblasted, or roughened, as indicated at 42, so that when it is empty it appears substantially translucent. Then, as explained in the aforementioned co-pending application, when liquid enters the glass tube and partially fills the same, the portion of the tube filled by the liquid will appear substantially transparent, while the remaining unfilled portion of the tube will appear substantially translucent. This permits the instrument to be quickly and easily read at some distance therefrom as the appearance of the tube changes greatly when liquid enters it.

The operation of the above described device is substantially as follows: Assuming that the chamber 17, the tube 30 and the tubular member 40 are substantially empty and that the automobile upon which the instrument is mounted is set in operation, vapor and liquid will flow into the chamber 17 by way of the apertures 20, the vapor being condensed within the chamber. As long as the internal combustion engine of the automobile operates under proper thermal conditions, insufficient vapor will be driven from the cooling liquid to materially raise the pressure within the radiator. However, if for any reason, the temperature of the cooling liquid rises to such a degree that the liquid simmers, the pressure within the radiator will rise sufficiently to drive the liquid in the chamber 17 up into the tube 30. This action takes place before the cooling liquid actually boils and therefore prevents wastage of the cooling fluid and is therefore advantageous in that the instrument need not be calibrated for any fixed boiling point. In other words, if the boiling point of the liquid is lowered by adding alcohol, or the equivalent, thereto, liquid will be forced into the tube 30 before the mixture boils, the liquid being forced into the tube during the aforementioned simmering stage. Also, if the boiling point of the liquid is lowered because of a change in altitude, an indication will be given in the tube 30 when the liquid simmers so that the driver of the automobile will be apprized of the fact before there is an actual wastage of the cooling fluid through the over-flow pipe or any other opening in the radiator.

While in the preferred embodiments of the invention, I generally prefer to seal the upper end of the tube 30 by means of the closure member 36, or the equivalent, it is possible that in some instances I may prefer to substitute an apertured cap therefor. Thus, in Fig. 5, I have illustrated a cap 36ª which may be employed in place of the cap 36, if it is so desired, the cap 36ª being provided with a relatively small vent opening 38. The vent opening 38 permits air to escape from the tube 30 when liquid is forced up into the tube and it is obvious that the liquid will be forced up into the tube a distance proportionate to the pressure obtaining in the radiator. However, in practice, I have found it advantageous to omit the vent 38 as all that is required is an indication of the simmering stage in the radiator before the actual wastage of the cooling fluid begins.

Referring now to Fig. 4 wherein I have illustrated another embodiment of the invention, the reference character 45 designates a housing member which preferably resembles aforementioned housing member 14 and is adapted to be secured to a radiator cap in substantially the same manner. It will be noted that the instrument illustrated in Fig. 4 comprises a tube 47 which is substantially identical to the aforementioned tube 30, the tube 47 being preferably provided with an interior ground, sand-blasted or roughened surface 48. The tube 47 may be observed through a single opening 49 formed in the housing member 45 and is preferably provided with a backing of colored material 50 which becomes visible through the tube 47 when the tube is filled with liquid. This feature is more fully described in my aforementioned co-pending application.

The operation of the instrument illustrated in Fig. 4 is substantially as follows: Assuming that the backing 50 is red in color, it will not be visible through the tube 47 as long as the tube remains empty. However, if liquid within the radiator upon which the housing member 45 is mounted reaches the simmering stage, liquid will be forced up into the tube 47 and the red color of the backing 50 will become visible to the driver of the automobile who will thus be warned that if the conditions which cause this rise of temperature in the cooling system are not corrected, the cooling liquid will shortly commence to waste.

The term "simmering" is used in the specification and claims to define that stage in the heating of liquid which immediately precedes the stage wherein the liquid boils violently. During the simmering stage bubbles rise in the liquid and vapor is given off.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A device for indicating pressure obtaining in a receptacle, said device comprising means including a tubular glass for utilizing liquid obtained from the receptacle for indicating said pressure, said glass being provided with a roughened surface arranged to be contacted by said liquid and said device being provided with an aperture through which all of said liquid may drain into said receptacle 2. The combination with an automobile radiator, of a device for utilizing liquid obtained from the radiator for indicating pressure obtaining therein, said device comprising means having a chamber communicating with the radiator above the level of the liquid therein, means having a passage extending upwardly from adjacent the bottom of the chamber, and means mounted in said last mentioned means through which liquid in the passage is visible.

3. A pressure indicating device comprising a housing member having a chamber therein, said chamber having an opening adjacent its upper end through which fluid may enter the chamber, and tubular means including a glass tube communicating with the chamber, the upper end of said tubular means being disposed above the chamber.

4. A pressure indicating device comprising a housing adapted to be mounted upon a receptacle for holding liquid, said housing being provided with a chamber arranged to lie within the receptacle in communication with the interior thereof, and means projecting into said chamber and provided with a passage extending from adjacent the bottom of said chamber to a point outside of said receptacle, said means including a member through which liquid in said passage may be observed.

5. A pressure indicating device adapted to be mounted upon a receptacle for holding liquid, said device comprising a chambered member projecting into said receptacle and being provided with ports spaced from the bottom of the chamber for admitting vapor from said receptacle into said chamber, and means having a passage from adjacent the bottom of said chamber to a point outside of the receptacle, said means including a member through which liquid in said passage may be observed.

6. A pressure indicating device adapted to be mounted upon a receptacle for holding liquid, said device comprising a chamber member projecting into said receptacle and being provided with ports spaced from the bottom of the chamber for admitting vapor from said receptacle into said chamber, said member being provided with a vent opening at the bottom of said chamber, and means having a passage from adjacent the bottom of said chamber to a point outside of the receptacle, said means including a member through which liquid in said passage may be observed.

7. A pressure indicating device adapted to be mounted upon a receptacle for holding liquid, said device comprising a chambered member projecting into said receptacle and being provided with ports spaced from the bottom of the chamber for admitting vapor from said receptacle into said chamber, and means having a passage from adjacent the bottom of said chamber to a point outside of the receptacle, said means including a glass member having a roughened surface engageable by liquid forced into said passage.

8. A pressure indicating device comprising a housing adapted to be mounted upon a receptacle for holding liquid, said housing being provided with a chamber arranged to lie within the receptacle in communication with the interior thereof, and means projecting into said chamber and provided with a passage extending from adjacent the bottom of said chamber to a point outside of said receptacle, said means including a glass member having a roughened surface engageable by liquid forced into said passage.

9. A pressure indicating device adapted to be mounted upon a receptacle for holding liquid, said device comprising a chamber member projecting into said receptacle and being provided with ports spaced from the bottom of the chamber for admitting vapor from said receptacle into said chamber, said member being provided with a vent opening at the bottom of said chamber, means having a passage from adjacent the bottom of said chamber to a point outside of the receptacle, said means including a member through which liquid in the passage may be observed, and means associated with said last-mentioned member and adapted to be observed through it when liquid enters said member.

10. A device of the kind described adapted to be mounted upon the radiator cap of an automobile radiator, said device comprising a housing member disposed within the radiator and provided with a chamber, said housing member being provided with ports spaced from the bottom of the chamber whereby fluid may flow from the receptacle into the chamber, a member carried by said housing and provided with a depression in which vapor may condense, said depression being adapted to drain into said chamber through said ports, a transparent member disposed above said radiator cap, and tubular means extending from a point adjacent the bottom of said chamber to a point within said transparent means.

11. A device for indicating pressure obtaining in a receptacle, said device comprising means including a cylindrical glass for utilizing liquid obtained from the receptacle for indicating said pressure, said glass being provided with a roughened surface arranged to be contacted by said liquid, and having an aperture through which all of said liquid may drain into said receptacle.

In testimony whereof, I have hereunto signed my name.

JOHN W. ANDERSON.